(12) United States Patent  
Rubin et al.

(10) Patent No.: US 7,945,217 B2  
(45) Date of Patent: May 17, 2011

(54) MULTI-MODE BASEBAND-IF CONVERTER

(75) Inventors: Zeev Rubin, Alphei Menashe (IL); Amir Eliaz, Ben-Shemen (IL)

(73) Assignee: Provigent Ltd., Herzliya (IL)

( * ) Notice: Subject to any disclaimer, the term of this patent is extended or adjusted under 35 U.S.C. 154(b) by 842 days.

(21) Appl. No.: 11/983,882

(22) Filed: Nov. 13, 2007

(65) Prior Publication Data

US 2009/0124213 A1    May 14, 2009

(51) Int. Cl.  
*H04B 1/40*    (2006.01)

(52) U.S. Cl. ............................................ 455/76; 455/86

(58) Field of Classification Search .................... 455/73, 455/76, 84, 85, 86, 550.1, 552.1, 553.1, 306, 455/307, 314, 315, 324  
See application file for complete search history.

(56) References Cited

U.S. PATENT DOCUMENTS

| | | | |
|---|---|---|---|
| 4,031,469 A | 6/1977 | Johnson | |
| 4,302,842 A | 11/1981 | Huriau | |
| 6,002,375 A | 12/1999 | Corman et al. | |
| 6,006,069 A | 12/1999 | Langston | |
| 6,418,301 B1 | 7/2002 | Le et al. | |
| 6,701,264 B2 | 3/2004 | Caso et al. | |
| 6,844,787 B2 | 1/2005 | Vann et al. | |
| 6,882,830 B2 * | 4/2005 | Higuchi | 455/84 |
| 6,965,633 B2 | 11/2005 | Sun et al. | |
| 7,031,748 B2 * | 4/2006 | Takagi | 455/553.1 |
| 7,176,589 B2 | 2/2007 | Rouquette | |
| 7,555,263 B1 | 6/2009 | Rofougaran et al. | |
| 2002/0168952 A1 | 11/2002 | Vishakhadatta et al. | |
| 2003/0157915 A1 | 8/2003 | Atkinson et al. | |
| 2004/0071165 A1 | 4/2004 | Redfern et al. | |
| 2004/0072547 A1 | 4/2004 | Axness et al. | |
| 2004/0136317 A1 | 7/2004 | Mohan | |
| 2004/0141469 A1 | 7/2004 | Jung et al. | |
| 2004/0166799 A1 | 8/2004 | Kral | |

(Continued)

FOREIGN PATENT DOCUMENTS

GB    2412541 A    9/2005

(Continued)

OTHER PUBLICATIONS

U.S. Appl. No. 12/005,574, filed Dec. 27, 2007, Zeev Rubin et al.

(Continued)

*Primary Examiner* — Thanh C Le  
(74) *Attorney, Agent, or Firm* — D. Kligler I.P. Services, Ltd.

(57) ABSTRACT

A configurable frequency conversion device includes an up-converter, which is arranged to convert an input transmit signal to an interim transmit signal at an intermediate transmit frequency and to convert the interim transmit signal to an output transmit signal at an output frequency. A down-converter is arranged to convert an input receive signal at an input frequency to an interim receive signal at an intermediate receive frequency and to convert the interim receive signal to an output receive signal. Local Oscillator (LO) generation circuitry is arranged to generate multiple LO signals having respective LO frequencies and is coupled to drive the up- and down-converter with the LO signals, and is externally configurable to modify one or more of the LO frequencies so as to modify any of the output frequency, the input frequency, and a separation between the output and input frequencies without changing the intermediate receive and transmit frequencies.

25 Claims, 5 Drawing Sheets

U.S. PATENT DOCUMENTS

| | | | |
|---|---|---|---|
| 2005/0124307 | A1 | 6/2005 | Ammar et al. |
| 2005/0174954 | A1 | 8/2005 | Yun et al. |
| 2006/0035595 | A1 | 2/2006 | Shi |
| 2006/0052066 | A1 | 3/2006 | Cleveland et al. |
| 2007/0105504 | A1 | 5/2007 | Vorenkamp et al. |

FOREIGN PATENT DOCUMENTS

| | | |
|---|---|---|
| WO | 02/058270 A3 | 7/2002 |
| WO | 03/071723 A1 | 8/2003 |
| WO | 03/090011 A2 | 10/2003 |
| WO | 2004/056013 A1 | 7/2004 |

OTHER PUBLICATIONS

W. Winkler et al., "High-Frequency Low-Noise Amplifiers and Low-Jitter Oscillators in SiGe:C BiCMOS Technology", Proceedings of SPIE International Symposium on Fluctuations and Noise, vol. 5470, Noise in Devices and Circuits II, pp. 185-192, Maspalomas, Gran Canaria (Spain), May 2004.

Mimix Broadband, Inc., "10.0-18.0 GHz GaAs MMIC Transmitter", Revision 1, Houston, USA, Mar. 2007.

Intel, "RF System and Circuit Challenges for WiMAX", vol. 8, issue 3, ISSN 1535-864X, Aug. 20, 2004.

International Application PCT/IL2008/001514 Search Report dated Apr. 2, 2009.

International Application PCT/IL2008/000981 Search Report dated Nov. 10, 2008.

Sierra Monolithics Inc, "RFICs and Evaluation Boards for WiMAX", USA, 2007 http://monolithics.com/wb/pages/products/broadband-wireless.php.

WiMAX, by Sierra Monolithics, Inc. http://www.monolithics.com.

Barrie Gilbert, "A Precise Four-Quadrant Multiplier with Subnanosecond Response", IEEE Journal of Solid-State Circuits, vol. Sc-3, No. 4, Dec. 1968.

"ISSCC: SiGe frequency synthesizer for 60 GHz", Heise Zeitschriften Verlag, 2005.

Klepser et al., "A 10-GHz SiGe BiCMOS Phase-Locked-Loop Frequency Synthesizer", IEEE Journal of Solid-State Circuits, vol. 37, No. 3, pp. 328-335, Mar. 2002.

U.S. Appl. No. 12/005,574 Official Action dated Dec. 28, 2010.

* cited by examiner

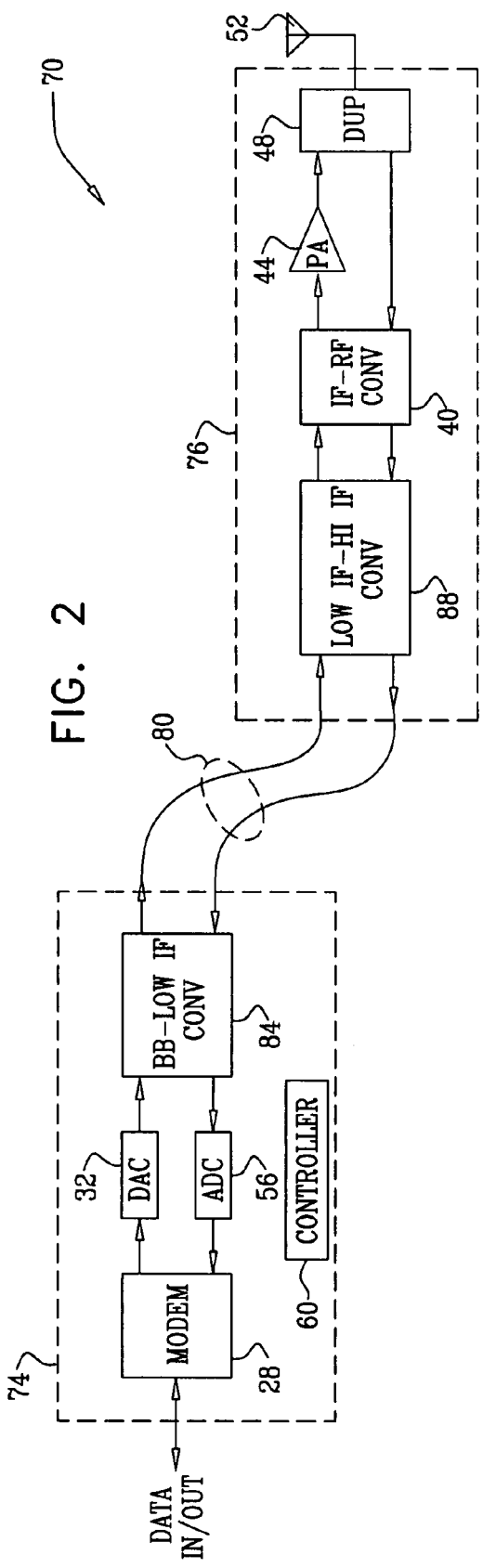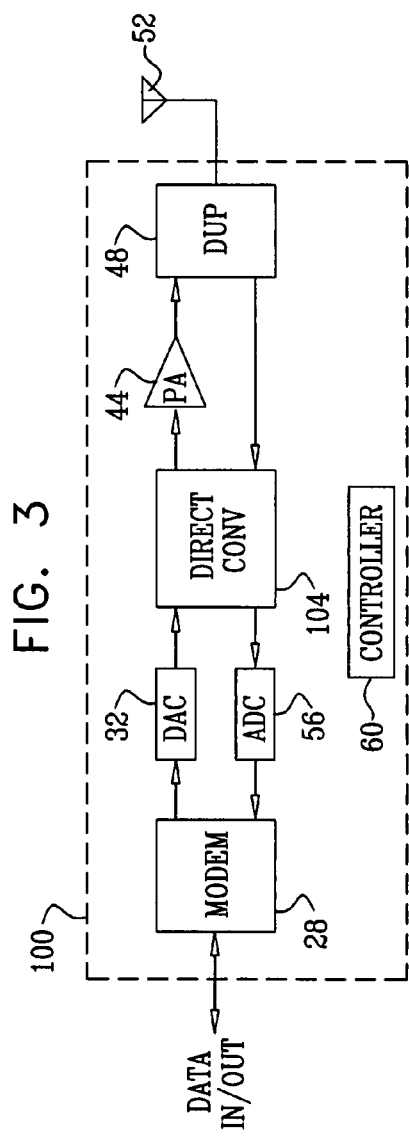
FIG. 2
FIG. 3

MULTI-MODE BASEBAND-IF CONVERTER

FIELD OF THE INVENTION

The present invention relates generally to communication systems, and particularly to methods and devices for performing frequency conversion in radio transceivers.

BACKGROUND OF THE INVENTION

Many communication systems use Radio Frequency Integrated Circuit (RFIC) devices for performing frequency up-conversion and down-conversion. For example, Sierra Monolithics, Inc. (Redondo Beach, Calif.) offers a dual-band up-converter/down-converter RFIC denoted SMI7035, for WiMAX (IEEE 802.16-2004) transceivers operating in the 2.3-2.7 and 3.3-3.8 GHz bands.

SUMMARY OF THE INVENTION

Embodiments of the present invention provide a configurable frequency conversion device, including:

an up-converter, which includes up-converter mixers and is arranged to convert an input transmit signal to an interim transmit signal at an intermediate transmit frequency and to convert the interim transmit signal to an output transmit signal at an output frequency by mixing the input transmit signal using the up-converter mixers;

a down-converter, which includes down-converter mixers and is arranged to convert an input receive signal at an input frequency to an interim receive signal at an intermediate receive frequency and to convert the interim receive signal to an output receive signal by mixing the input receive signal using the down-converter mixers; and Local Oscillator (LO) generation circuitry, which is arranged to generate multiple LO signals having respective LO frequencies and is coupled to drive the up-converter and down-converter mixers with the LO signals, and which is externally configurable to modify one or more of the LO frequencies so as to modify any of the output frequency, the input frequency, and a separation between the output frequency and the input frequency without changing the intermediate receive and transmit frequencies.

In some embodiments, the LO generation circuitry is externally configurable to operate in multiple operational modes, which include at least:

a first operational mode, in which the input transmit signal and the output receive signal include baseband signals, and the output transmit signal and the input receive signal include first Intermediate Frequency (IF) signals in a first frequency range;

a second operational mode, in which the input transmit signal and the output receive signal include the baseband signals, and the output transmit signal and the input receive signal include second IF signals in a second frequency range that is different from the first frequency range; and a third operational mode, in which the input transmit signal and the output receive signal include the second IF signals, and the output transmit signal and the input receive signal include third IF signals in the first frequency range.

In another embodiment, the device further includes a low-frequency interface coupled to input the input transmit signal and output the output receive signal, and a high-frequency interface, coupled to output the output transmit signal and input the input receive signal, and configured, when the LO generation circuitry is operating in the second operational mode, to be coupled to the low-frequency interface of another configurable frequency conversion device, whose LO generation circuitry is operating in the third operational mode. The high frequency interface is sometimes configured to be connected to the low-frequency interface of the other configurable frequency conversion device via a transmission line.

In a disclosed embodiment, the first operational mode includes first and second sub-modes, the up-converter and the down-converter are each configured to perform a single frequency conversion operation when the LO generation circuitry is operating in the first sub-mode, and two or more frequency conversion operations when the LO generation circuitry is operating in the second sub-mode.

In another embodiment, only one of the LO signals generated by the LO generation circuitry is tunable, and the LO generation circuitry can be programmed to modify a frequency of the tunable LO signal. In yet another embodiment, the LO generation circuitry can be programmed to tune one of the input frequency and the output frequency, while keeping the other of the input frequency and the output frequency fixed. In still another embodiment, the LO generation circuitry can be programmed to set the output frequency both to values that are higher than the input frequency and to values that are lower than the input frequency.

In some embodiments, the up-converter and the down-converter operate concurrently with one another in full-duplex. In an embodiment, one or more of the up-converter and down-converter mixers includes a Gilbert cell mixer, and the LO generation circuitry can be configured to bypass the Gilbert cell mixer by applying a fixed bias voltage to the Gilbert cell mixer.

In an embodiment, the device includes a high-frequency interface, which is coupled to output the output transmit signal and input the input receive signal, and is configured to be coupled to a Radio Frequency (RF) conversion unit for up-converting the output transmit signal to a transmit RF signal and for down-converting a receive RF signal to produce the input receive signal. The device may include a controller, which is arranged to externally configure the LO generation circuitry.

There is additionally provided, in accordance with an embodiment of the present invention, a frequency conversion apparatus, including:

an Intermediate Frequency (IF) conversion unit, including:

an up-converter, which includes up-converter mixers and is arranged to convert an input transmit signal to an interim transmit signal at an intermediate transmit frequency and to convert the interim transmit signal to a transmit IF signal at an output frequency by mixing the input transmit signal using the up-converter mixers;

a down-converter, which includes down-converter mixers and is arranged to convert a receive IF signal at an input frequency to an interim receive signal at an intermediate receive frequency and to convert the interim receive signal to an output receive signal by mixing the input receive signal using the down-converter mixers; and Local Oscillator (LO) generation circuitry, which is arranged to generate multiple LO signals having respective LO frequencies and is coupled to drive the up-converter and down-converter mixers with the LO signals, and which is externally configurable to modify one or more of the LO frequencies so as to modify any of the output frequency, the input frequency, and a separation between the output frequency and the input frequency without changing the intermediate receive and transmit frequencies; and a Radio Frequency (RF) conversion unit, which is arranged to up-convert the transmit IF signal to produce a transmit RF signal and to down-convert a receive RF signal to produce the receive IF signal.

There is further provided, in accordance with an embodiment of the present invention, a frequency conversion apparatus for converting between baseband signals and Intermediate Frequency (IF) signals, including:

a first subsystem, which includes a first frequency conversion device including first and second cascaded conversion stages; and a second subsystem, which is connected to the first subsystem by a transmission line and includes a second frequency conversion device identical to the first frequency conversion device, wherein the second conversion stage of the first frequency conversion device is bypassed so that the first subsystem is configured to convert between the baseband signals and interim IF signals, and the first conversion stage of the second frequency conversion device is bypassed so that the second subsystem is configured to convert between the interim IF signals exchanged with the first subsystem and the IF signals.

There is also provided, in accordance with an embodiment of the present invention, a method for frequency conversion in a configurable frequency conversion device, the method including:

up-converting an input transmit signal to an interim transmit signal at an intermediate transmit frequency and converting the interim transmit signal to an output transmit signal at an output frequency using up-converter mixers;

down-converting an input receive signal at an input frequency to an interim receive signal at an intermediate receive frequency and converting the interim receive signal to an output receive signal using down-converter mixers; and generating multiple Local Oscillator (LO) signals having respective LO frequencies, driving the up-converter and down-converter mixers with the LO signals, and, in response to external configuration, modifying one or more of the LO frequencies so as to modify any of the output frequency, the input frequency, and a separation between the output frequency and the input frequency without changing the intermediate receive and transmit frequencies.

There is additionally provided, in accordance with an embodiment of the present invention, a method for frequency conversion between baseband signals and Intermediate Frequency (IF) signals, including:

connecting a first subsystem, which includes a first frequency conversion device that includes first and second cascaded conversion stages via a transmission line to a second subsystem, which includes a second frequency conversion device identical to the first frequency conversion device;

configuring the first subsystem to convert between the baseband signals and interim IF signals by bypassing the second conversion stage of the first frequency conversion device;

configuring the second subsystem to convert between the interim IF signals exchanged with the first subsystem and the IF signals by bypassing the first conversion stage of the second frequency conversion device; and converting between the baseband signals and the IF signals using the connected first and second subsystems.

The present invention will be more fully understood from the following detailed description of the embodiments thereof, taken together with the drawings in which:

BRIEF DESCRIPTION OF THE DRAWINGS

FIGS. 2 and 3 are block diagrams that schematically illustrate radio transceivers, in accordance with alternative embodiments of the present invention;

DETAILED DESCRIPTION OF EMBODIMENTS

Overview

Figure 1:
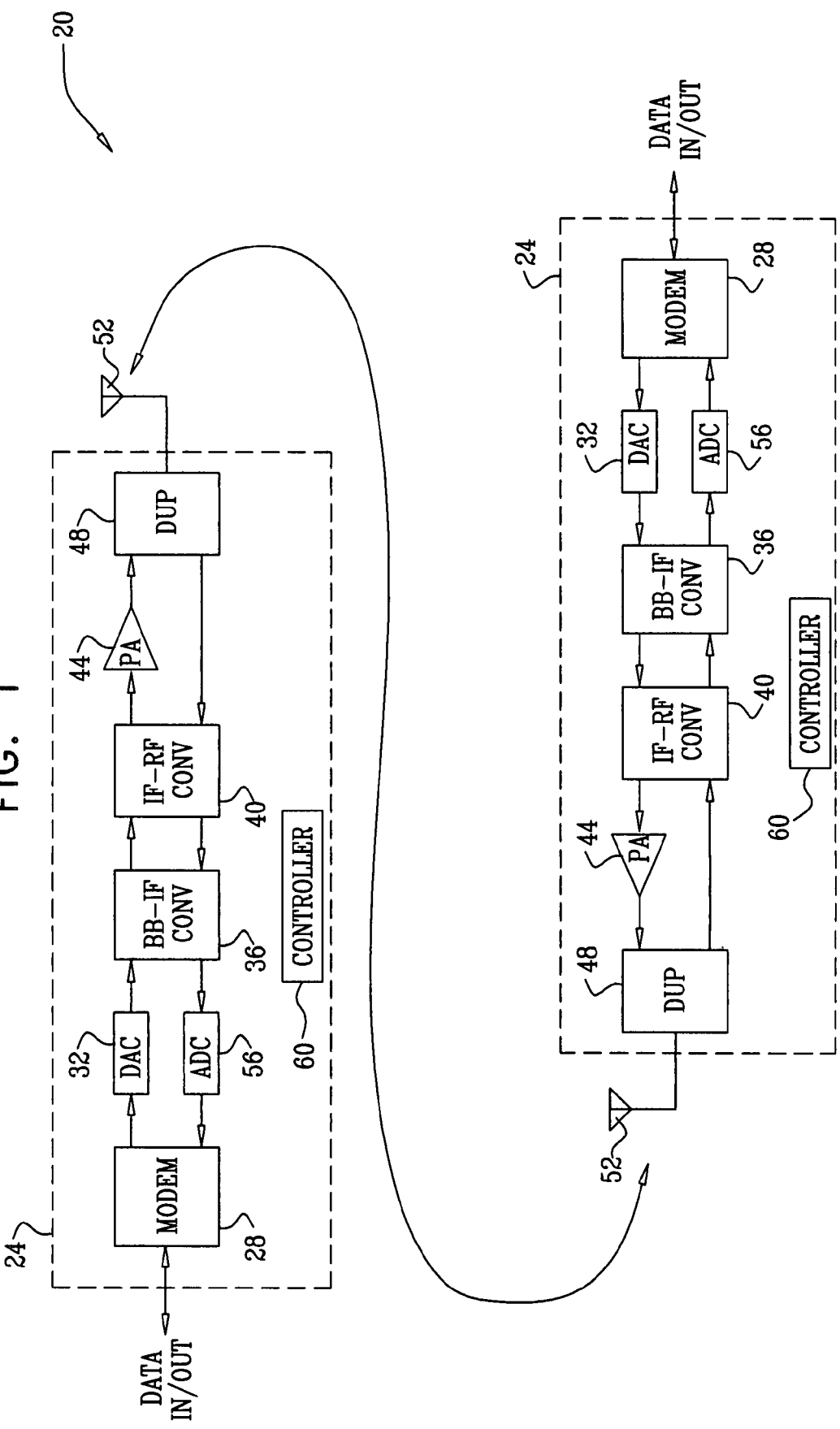
FIG. 1 is a block diagram that schematically illustrates a wireless communication link, in accordance with an embodiment of the present invention.

Embodiments of the present invention provide improved methods and devices for performing up-conversion and down-conversion between baseband and Intermediate Frequency (IF) in radio transceivers. The term "Intermediate Frequency" is used in the present patent application and in the claims in the conventional sense, to denote any frequency that is used in an intermediate frequency conversion step, to or from the designated transmission and reception frequencies of the transceiver. In some embodiments, a multi-mode Baseband-IF (BB-IF) converter device comprises an up-converter and a down-converter, which are able to operate concurrently in full duplex, e.g., using Frequency-Division Multiplexing (FDD). The BB-IF converter usually operates in series with an IF-Radio-Frequency (IF-RF) converter, which converts the IF to and from the appropriate radio frequencies used by the transceiver.

The transmit-receive (TX/RX) frequency separation between the up-converter output and the down-converter input frequencies of the multi-mode BB-IF devices described herein is programmable. Additionally, the devices can be configured to perform baseband-to-IF up-conversion and IF-to-baseband down-conversion in a number of operational modes. For example, in a tunable-TX mode, the up-converter output frequency is tunable, while the down-converter input frequency is fixed. In a tunable-RX mode, the up-converter output frequency is fixed, and the down-converter input frequency is tunable. The devices also support direct up-conversion and down-conversion modes, in which only a single conversion operation is performed.

By using the different operational modes, the multi-mode BB-IF devices described herein can be easily integrated with various IF-RF converter configurations and products. Moreover, the devices can be used in different transceiver configurations, such as in transceivers whose functions are partitioned between an Indoor Unit (IDU) and an Outdoor Unit (ODU). Since the up-converter output frequency (the TX frequency) can be set to values that are either higher or lower than the down-converter input frequency (the RX frequency), identical BB-IF devices can be used at both ends of an FDD communication link. Several exemplary transceiver configurations are described hereinbelow.

Unlike some known BB-IF devices in which hardware has to be replaced or modified in order to change the operating frequency or the TX/RX separation or to match a different transceiver configuration, the devices described herein can programmed and reconfigured without hardware modification. This feature enables considerable operational flexibility and reduces the operating costs of a transceiver manufacturer, since only a single device type needs to be stocked, regardless of the number of different bands, operational modes and transceiver configurations supported.

In some of the operational modes, the BB-IF converter devices described herein perform two or three cascaded conversion operations when up-converting or down-converting signals. The signals produced by these conversion operations are referred to as interim signals. The interim signals are filtered by filters, which are often external to the BB-IF converter device. The BB-IF converter devices described herein are able to tune the TX and RX frequencies, as well as the TX/RX separation, while keeping the frequency of any interim signal used in the conversion fixed. Thus, the same BB-IF converter can be used in a wide variety of TX/RX frequency values and installation types without having to modify or replace filters. This feature provides further reduction of the operating costs and increases the operational flexibility of a transceiver or system manufacturer.

System Description

FIG. 1 is a block diagram that schematically illustrates a wireless communication link 20, in accordance with an embodiment of the present invention.

Link 20 comprises two terminals 24, also referred to as transceivers, which communicate with one another over a radio channel. In the embodiments that are described hereinbelow, link 20 comprises a point-to-point microwave wireless link. In alternative embodiments, however, link 20 may comprise a point-to-point or point-to-multipoint, wireless or wireline link, or any other suitable type of communication link that uses radio signals.

Link 20 comprises a bidirectional link in which each transceiver 24 functions as both a transmitter and a receiver. The two opposite directions of the link may operate concurrently with one another in full duplex, such as using Frequency Division Duplex (FDD). Alternatively, the two link directions may operate in alternation, using Time-Division Duplex (TDD).

On transmission, input data is provided to the transmitter. A modem 28 modulates the input data using a certain modulation scheme, and produces a stream of digital modulated samples. The modem often performs additional functions, such as encoding the data using a suitable Forward Error Correction (FEC) code and filtering the modulated samples using a pulse-shaping filter. A Digital-to-Analog Converter (DAC) 32 converts the digital modulated samples to an analog baseband signal.

The analog baseband signal is converted to a Radio Frequency (RF) signal in two stages. A Baseband-Intermediate-Frequency (BB-IF) converter 36 converts the baseband signal to an IF signal, and an IF-RF converter 40 converts the IF signal to an RF signal having the appropriate transmission frequency of the link. The BB-IF and IF-RF converters may perform additional functions, such as filtering, amplification and/or Automatic Gain Control (AGC). The RF signal is amplified by a Power Amplifier (PA) 44 and provided to an antenna 52. In the present example, link 20 uses FDD, and the PA output is connected to the antenna via a duplexer 48. Alternatively, when the link uses TDD, the PA output can be connected to the antenna via a suitable Transmit/Receive (T/R) switch (not shown). The antenna transmits the RF signal over a wireless channel to the receiver.

On reception, i.e., at the transceiver at the opposite end of link 20, the transmitted RF signal is received by antenna 52 and provided to IF-RF converter 40 via duplexer 48 (or via a T/R switch when using TDD). IF-RF converter 40 down-converts the RF signal to an IF signal, and BB-IF converter 36 down-converts the IF signal to baseband. The BB-IF and IF-RF converters may also filter and amplify the signal, as well as apply AGC. The baseband signal produced by the BB-IF converter is digitized by an Analog-to-Digital Converter (ADC) 56, which produces a stream of digital samples. The samples are provided to modem 28, which demodulates the signal so as to reconstruct the data. If FEC is used, the modem also decodes the FEC code. The modem may also perform functions such as synchronization, adaptive equalization, filtering, carrier recovery and AGC.

Transceiver 24 comprises a controller 60, which configures and controls the different transceiver elements. In particular, the controller configures and controls BB-IF converter 36, as will be explained in detail below. Typically, controller 60 comprises a general-purpose processor, which is programmed in software to carry out the functions described herein. The software may be downloaded to the processor in electronic form, such as over a network or over the wireless link, or it may alternatively be supplied to the processor on tangible media, such as CD-ROM. Alternatively, controller 60 may comprise configuration logic implemented in hardware or firmware (e.g., in a Field Programmable Gate Array—FPGA), for configuring the IF-BB converter.

FIG. 2 is a block diagram that schematically illustrates a radio transceiver 70, in accordance with an alternative embodiment of the present invention. The functionality of transceiver 70 is similar to that of transceiver 24 of FIG. 1 above. In the configuration of FIG. 1, transceiver 24 is typically installed in an outdoor unit (ODU) located close to antenna 52, in order to minimize cable losses. In the configuration of FIG. 2, however, the functions of transceiver 70 are split between an indoor unit (IDU) 74 and an ODU 76, which are connected by a cable 80. Cable 80 may comprise a coaxial cable or any other suitable transmission line. The cable may typically reach a length of up to several hundred feet, depending on the specific transceiver installation.

In order to reduce signal losses in cable 80, it is desirable to design the transceiver so that the frequency of the signal transmitted over the cable is as low as practical. For this purpose, the BB-IF conversion functionality in transceiver 70 is divided between a BB-low-IF converter 84 in the IDU, and a low-IF-high-IF converter 88 in the ODU. On transmission, converter 84 in the IDU up-converts the analog baseband signal produced by DAC 32 to a low-IF signal, which is transmitted over cable 80. At the ODU, converter 88 continues to up-convert the low-IF signal to high IF (the IF expected by IF-RF converter 40). On reception, converter 88 in the ODU down-converts the IF output of IF-RF converter 40 to low IF, which is sent over cable 80. Converter 84 in the IDU continues to down-convert this signal to baseband and provides the baseband signal to ADC 56.

FIG. 3 is a block diagram that schematically illustrates a radio transceiver 100 for a Modem in the Out Door architecture, in accordance with yet another embodiment of the present invention. Transceiver 100 comprises a direct up-conversion unit 104. On transmission, unit 104 up-converts the baseband output of DAC 32 to RF in a single conversion operation. On reception, unit 104 down-converts the received RF signal to baseband in stages, similarly to the down-conversion operation of transceiver 24 of FIG. 1 above. In alternative embodiments, down-conversion can also be carried out in a single conversion operation.

Although the transceiver configurations described above refer to a single ADC and a single DAC, transceivers 24, 70 and 100 can also be carried out using dual-converter configurations that produce In-phase/Quadrature (I/Q) signals. These configurations are well-known in the art.

Communication Link Frequency Configurations

In many practical applications, the two opposite directions of link 20 transmit on two separate radio frequencies. For example, when link 20 comprises a microwave or millimeter-wave link, the radio frequencies used by the two link directions are typically allocated in accordance with certain spectrum allocation standards. These standards often define a particular frequency separation between the two frequencies, which is referred to as TX/RX separation or T/R spacing. Each link is allocated a pair of frequencies having the specified separation.

The TX/RX separation usually has different values in different frequency bands. For example, spectrum allocations in the 15 GHz frequency band often use 728 MHz TX/RX separation, 8 GHz band channels are typically allocated with a TX/RX separation of 310 MHz, at 38 GHz the separation is typically 1260 MHz, and at 23 GHz the separation is typically 1008 MHz.

Frequency up-conversion and down-conversion operations in radio transceivers are usually performed by mixers, which mix the signal with suitable Local Oscillator (LO) signals. The mixing operation is usually followed by suitable filtering, in order to remove undesired products produced by the mixer. The frequency of the LO signal provided to the mixer determines the frequency offset between the input and output of the mixer. In order to perform the desired frequency conversion over a specified bandwidth, while adequately rejecting undesired conversion products, frequency conversion is often performed by a chain of two or more cascaded mixers and filters, which apply a sequence of mixing and filtering operations. Such multiple conversion techniques are well-known in the art.

Given a particular TX/RX separation, the transceiver is configured to operate in a specific pair of transmit and receive frequencies by selecting the appropriate LO frequencies applied to its mixers. Transceivers, and in particular BB-IF converters, can be designed using either "tunable-TX" or "tunable-RX" configurations, or both. In tunable-TX configurations, at least one of the LO signals applied to the up-converting mixer chain is tunable, whereas the LO frequencies of the down-conversion chain are fixed. In tunable-RX configurations, one or more of the LO signals applied to the down-conversion chain has a tunable frequency, while the LO signals provided to the up-conversion mixer chain are fixed in frequency.

Figure 4:
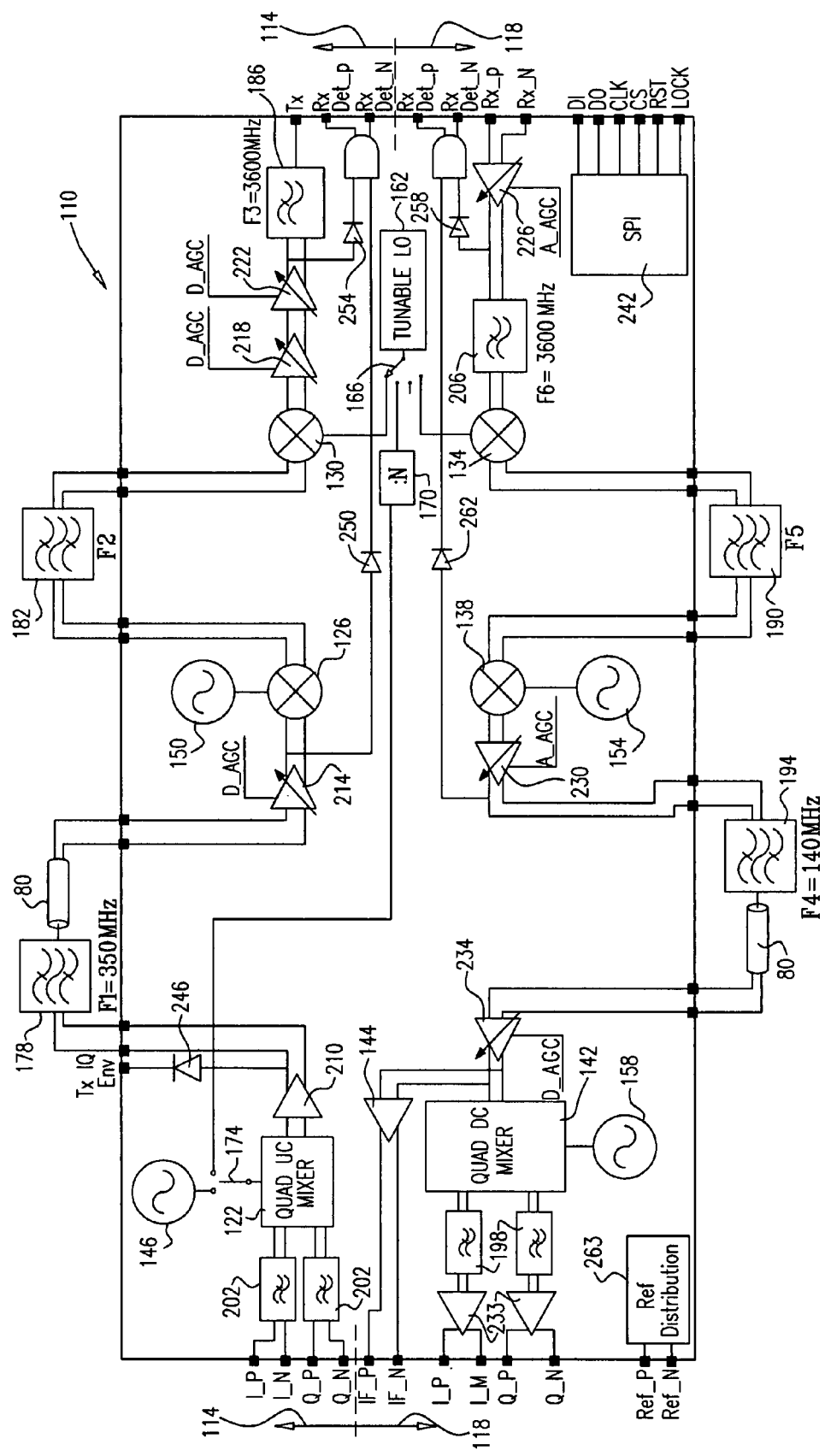
FIG. 4 is a block diagram that schematically illustrates a multi-mode baseband-IF converter, in accordance with an embodiment of the present invention.
Figure 6:
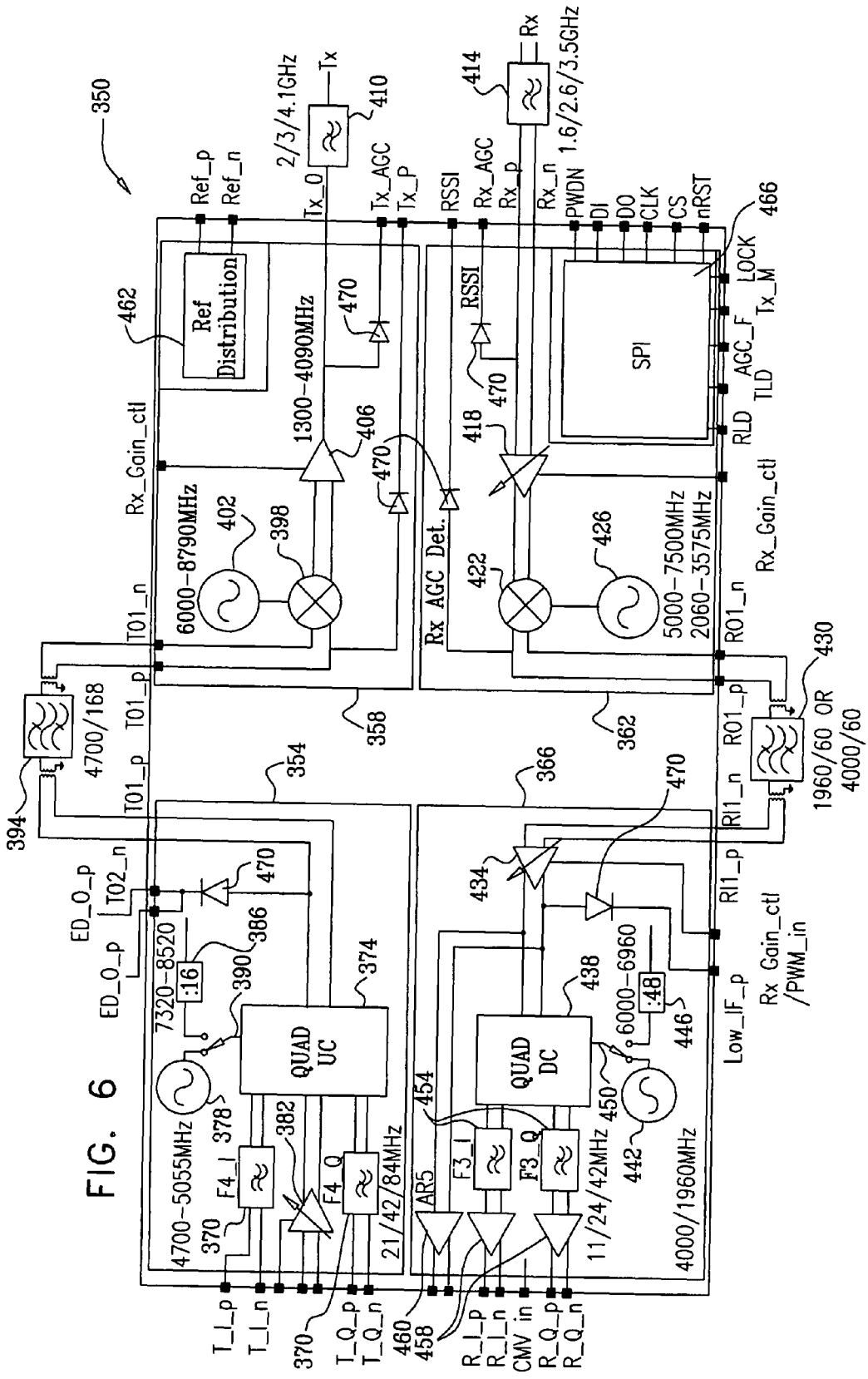
FIG. 6 is a block diagram that schematically illustrates a multi-mode baseband-IF converter, in accordance with an alternative embodiment of the present invention.

Embodiments of the present invention provide improved methods and devices for performing BB-IF conversion in radio transceivers. As will be shown in detail below, a single multi-mode BB-IF device supports flexible, programmable selection of TX/RX separation values. The same device enables tunable-TX, tunable-RX and direct up-conversion and down-conversion operations, and can be used in any of the transceiver configurations described in FIGS. 1-3 above. Exemplary designs of such configurable BB-IF devices are shown in FIGS. 4 and 6 below.

In addition, the BB-IF devices described herein can be configured so that the up-converter output frequency is either higher or lower than the down-converter input frequency. This feature enables using identical devices in the transceivers at both ends of a communication link, since the transmission frequency of each transceiver is the reception frequency of the other. In particular, identical BB-IF devices can be used at both ends of the communication link even when the conversion between IF and RF is performed jointly for transmission and for reception e.g., with a single RF synthesizer.

In some embodiments, the different operational modes described above are supported by the same BB-IF device using only a single tunable LO signal and a relatively simple LO switching scheme, which is typically software-configurable.

Multi-Mode Baseband-IF Converter Configurations

FIG. 4 is a block diagram that schematically illustrates a multi-mode BB-IF converter 110, in accordance with an embodiment of the present invention. In some embodiments, converter 110 is implemented in a single RFIC device. BB-IF converter 110 can be used to implement converter 24 in the configuration of FIG. 1 above and/or to implement converter 104 in the configuration of FIG. 3 above. Two converters 110, one located in the IDU and one in the ODU, can be used to implement converters 84 and 88 in the configuration of FIG. 2 above.

Converter 110 supports several operational modes, which are set via an external interface, such as by controller 60. The device supports programmable TX/RX separation, and can be set to operate over a wide frequency bandwidth. Different operational modes enable tunable-TX, tunable-RX and direct up-conversion/down-conversion operation in the same device.

Although the description that follows addresses specific frequency values, frequency ranges and bandwidths, the principles of the present invention can be used to implement BB-IF converters that use any other suitable set of RF values, IF values and/or bandwidths.

Converter 100 comprises an up-converter 114 and a down-converter 118. The up-converter and down-converter operate concurrently, so as to enable link 20 to operate in full duplex, e.g., using FDD. Up-converter 114 accepts a baseband I/Q signal from a pair of DACs 32, and up-converts the signal using a cascaded chain of three up-converting mixers 122, 126 and 130. The up-converter produces an IF signal, in the present example in the 3.6 GHz band. Down-converter 118 accepts an IF signal in the 3.6 GHz band and down-converts it using a cascaded chain of three down-converting mixers 134, 138 and 142. (Typically, the difference between the IF frequencies used by the up-converter and down-converter is equal to the TX/RX separation.) The down-converter produces a baseband I/Q signal, which is provided to a pair of ADCs 56. The down-converter also outputs the IF signal at the output of mixer 138, via an amplifier 144.

The up-converting and down-converting mixers are driven by LO signals, of which only one is tunable. Up-converting mixer 122 is driven by a LO signal produced by a synthesized oscillator 146. The frequency of this LO signal can be preset to frequencies in the range 310-350 MHz. Up-converting mixer 126 is driven by a LO signal produced by an oscillator 150. Down-converting mixer 138 is driven by an oscillator 154. Down-converting mixer 142 is driven by a synthesized oscillator 158. The LO signal produced by oscillator 158 can be preset to frequencies between 110-140 MHz. The setting of these oscillators in the different operational modes of converter 110 is described below.

BB-IF converter 110 comprises a single tunable oscillator 162, which is used for driving up-converting mixer 130 and down-converting mixer 134. Oscillator 162 produces an LO signal whose frequency can vary over a wide range, depending on the desired operating frequency of converter 110. Several exemplary configurations are shown further below. In some of these configurations, oscillator 162 produces an LO signal in the range 6610-8170 MHz. In other configurations, oscillator 162 produces an LO signal in the range 2425-3925 MHz.

Oscillator 162 is connected to mixers 130 and 134 via a multi-position switch 166, which may be controlled by controller 60. The switch connects oscillator 162 to up-converting mixer 130 in tunable-TX configurations, and to down-converting mixer 134 is tunable-RX configurations.

In some embodiments, converter 110 can also be configured to perform direct up-conversion. In these configurations, the output of oscillator 162 is divided using a frequency divider 170 by a factor that is configurable between two and forty-eight, so as to enable a wide conversion range. The output of divider 170 is applied to up-converting mixer 122. A switch 174, which is typically controlled by controller 60, selects whether to drive mixer 122 with the fixed LO produced by oscillator 146 or with the tunable LO produced by oscillator 162.

Mixers 130 and 134 comprise Gilbert cell mixers. A Gilbert cell mixer, as is known in the art, can be bypassed by replacing its LO signal with a constant Direct Current (DC) bias voltage. When switch 166 connects oscillator 162 to one of mixers 130 and 134, a fixed bias voltage is applied to the other mixer using a switched biasing circuit (not shown). As a result of the fixed bias, the mixer that is not connected to oscillator 162 functions as a constant-gain buffer and does not perform any frequency conversion. Using the bypassing property of Gilbert cell mixers, converter 110 is able to operate over a wide bandwidth and support a variety of operational modes with only a single tunable oscillator and with a relatively simple LO switching scheme.

Oscillators 146, 158 and 162, switches 166 and 174 and divider 170 can be viewed collectively as a LO generation circuit, which produces the appropriate LO signals for driving the different mixers of BB-IF converter 110. The LO generation circuit applies the appropriate LO switching, depending on the operational mode used by the device, so as to drive each mixer with the appropriate LO signal. As can be seen, only the LO signal produced by oscillator 162 is tunable. All other LO signals have fixed frequencies.

The output of each mixer in BB-IF converter 110 is filtered by a respective filter, in order to suppress undesired products produced by the mixers. The outputs of up-converting mixers 122, 126 and 130 are filtered by filters 178, 182 and 186, respectively. The outputs of down-converting mixers 134, 138 and 142 are filtered by filters 190, 194 and 198, respectively. Typically but not necessarily, when converter 110 is implemented in a RFIC, some or all of these filters are external to the RFIC. In addition, the I/Q input to up-converter 114 is filtered by filters 202, and the input of down-converter 118 is filtered by a filter 206. These filters are typically implemented internally to the RFIC.

BB-IF converter 110 comprises several amplifier stages, which amplify the up-converted and down-converted signals. Up-converter 114 comprises amplifiers 210, 214, 218 and 222. Down-converter 118 comprises amplifiers 226, 230, 234 and 238. The amplifiers are used for compensating for the insertion loss of the filters and mixers, and for providing the desired signal levels, noise levels and dynamic ranges along the up-converter and down-converter chains as function of transmit and receive power levels.

Some of the amplifiers may comprise variable-gain amplifiers, whose gain is controlled by controller 60.

The variable-gain amplifiers can be used, for example, to adapt the gain of the up-converter and/or down-converter as part of an AGC loop of the link, to compensate for gain variations caused by temperature or aging, to set the up-converter and/or down-converter gain during installation, and/or to compensate for channel dynamics that affect the received or transmit signal power. In the exemplary configuration of FIG. 4, amplifiers 214, 218, 222, 226, 230 and 234 comprise variable-gain amplifiers. In alternative embodiments, the up-converter and/or down-converter gain can be modified using variable-gain attenuators instead of amplifiers or a combination of both variable-gain methods.

Converter 110 is connected to controller 60 using a suitable interface, such as a Serial Peripheral Interface (SPI) 242. The interface is used for programming oscillators 146, 158 and 162, for controlling switches 166 and 174, and for setting the gains of the variable-gain amplifiers.

In some embodiments, converter 110 comprises detectors, such as envelope detectors, which measure the signal strength at different points in the up-converter and down-converter chains and provide respective indications to controller 60. In the configuration of FIG. 4, up-converter 114 comprises detectors 246, 250 and 254, and down-converter 118 comprises detectors 258 and 262.

In the present example, the different oscillators of converter 110 are locked to a common reference signal, which is supplied by a frequency source external to the IF-BB converter. Converter 110 comprises a reference distribution unit 263, which accepts the external reference signal and distributes it to the different LO generation circuits.

Tunable-TX, Tunable-RX and Direct Up-Conversion Operation

Multi-mode BB-IF converter 110 can be programmed to operate in several operational modes. For tunable-TX operation, switch 166 is set to connect oscillator 162 to up-converting mixer 130, while down-converting mixer 134 is bypassed. In this mode, the output frequency of up-converter 114 is tunable in the range 1960-3520 MHz. The input frequency of down-converter 118 is fixed. The baseband signal at the input of up-converter 114 is up-converted by mixer 122 to a center frequency of 350 MHz. Filter 178 is thus centered around 350 MHz. Oscillator 150 produces a LO signal whose frequency is 4300 MHz. Mixer 126 up-converts the 350 MHz signal to 350+4300=4650 MHz. Filter 182 is centered around 4650 MHz. Oscillator 162 is tunable in the range 6610-8170 MHz. Therefore, mixer 130 up-converts the 4650 MHz signal to a respective frequency in the range 1960-3520 MHz. Filter 186 comprises a low-pass filter (LPF) having a cutoff frequency of approximately 3600 MHz.

In this mode, the input frequency of down-converter 118 is fixed at 1960 MHz. Mixer 134 is bypassed, therefore its output is also at 1960 MHz, which is the center frequency of filter 190. Oscillator 154 produces a 2100 MHz LO signal, therefore mixer 138 down-converts the 1960 MHz signal to 2100−1960=140 MHz. Filter 194 is centered around 140 MHz. Oscillator 158 is set to produce a 140 MHz LO signal, so that mixer 142 down-converts the 140 MHz signal to baseband.

For tunable-RX operation, switch 166 is set to connect oscillator 162 to down-converting mixer 134, while up-converting mixer 130 is bypassed. The output frequency of up-converter 114 is fixed. The tunable-RX mode is split into two sub-modes, which enable the down-converter to achieve an extremely wide bandwidth. In the first sub-mode, the input frequency of down-converter 118 is tunable in the range 1960-3520 MHz, by having oscillator 162 tune the range 6610-8170 MHz. Mixer 134 thus produces a center frequency of 4650 MHz. Oscillator 154 is set to produce a 4510 MHz LO signal, so that mixer 138 produces a center frequency of 140 MHz.

In the second sub-mode of the tunable-RX mode, the input frequency of down-converter 118 is tunable in the range 100-1600 MHz, by having oscillator 162 tune the range 2425-3925 MHz. Oscillator 154 is set to produce a 2465 MHz LO, and filter 190 is centered around 2325 MHz, causing mixer 138 to produce a center frequency of 140 MHz.

In the tunable-RX mode, oscillator 146 is set to 350 MHz, and oscillator 150 is set to 2310 MHz. Mixer 126 produces a center frequency of 1960 MHz. Since mixer 130 is bypassed, the up-converter output is fixed at 1960 MHz.

In the direct up-conversion operational mode, oscillators 146 and 150 are disabled, and switches 174 and 166 route the output of oscillator 162 to drive mixer 122. Filter 178 is omitted, and the output of amplifier 210 is connected directly to the input of mixer 130. Mixer 130 is bypassed in this mode by applying a DC bias voltage, and the signal is filtered by internal filter 186 and provided as output. The up-converter is tunable in the range 1920-3520 MHz by tuning oscillator 162. Down-converter 118 is configured similarly to the tunable-TX mode.

Single-Unit and IDU/ODU Configurations

BB-IF converter 110 can be used in any of the transceiver configurations shown in FIGS. 1-3 above. When using converter 110 to implement BB-IF converter 36 in transceiver 24 of FIG. 1 above, external filter 178 is connected between the output of amplifier 210 and the input of amplifier 214. External filter 182 is connected between the output of mixer 126 and the input of mixer 130. External filter 190 is connected between the output of mixer 134 and the input of mixer 138. External filter 194 is connected between the output of amplifier 230 and the input of amplifier 234.

When implementing the IDU/ODU configuration of FIG. 2 above, one converter 110 is used to implement BB-low-IF converter 84 in IDU 74, and another converter 110 is used to implement low-IF-high-IF converter 88 in ODU 76.

In the IDU, converter 84 is implemented using only the left-hand-side of the block diagram of FIG. 4. On transmission, the output of external filter 178 is used as the up-converter output of converter 84, thus transmitting a 350 MHz IF signal over cable 80 to the ODU. On reception, a 140 MHz IF signal from cable 80 is provided to the input of amplifier 234.

In the ODU, only the right-hand-side of the block diagram of FIG. 4 is used for implementing converter 88. On transmission, the 350 MHz IF signal from cable 80 is provided to the input of amplifier 214. On reception, the 140 MHz output of external filter 194 is send over cable 80 to the IDU.

The transceiver configurations of FIGS. 1 and 2 above can use either the tunable-TX or the tunable-RX operational modes, as desired. When implementing transceiver 100 of FIG. 3 above, converter 110 operates in the direct up-conversion operational mode described above.

Figure 5:
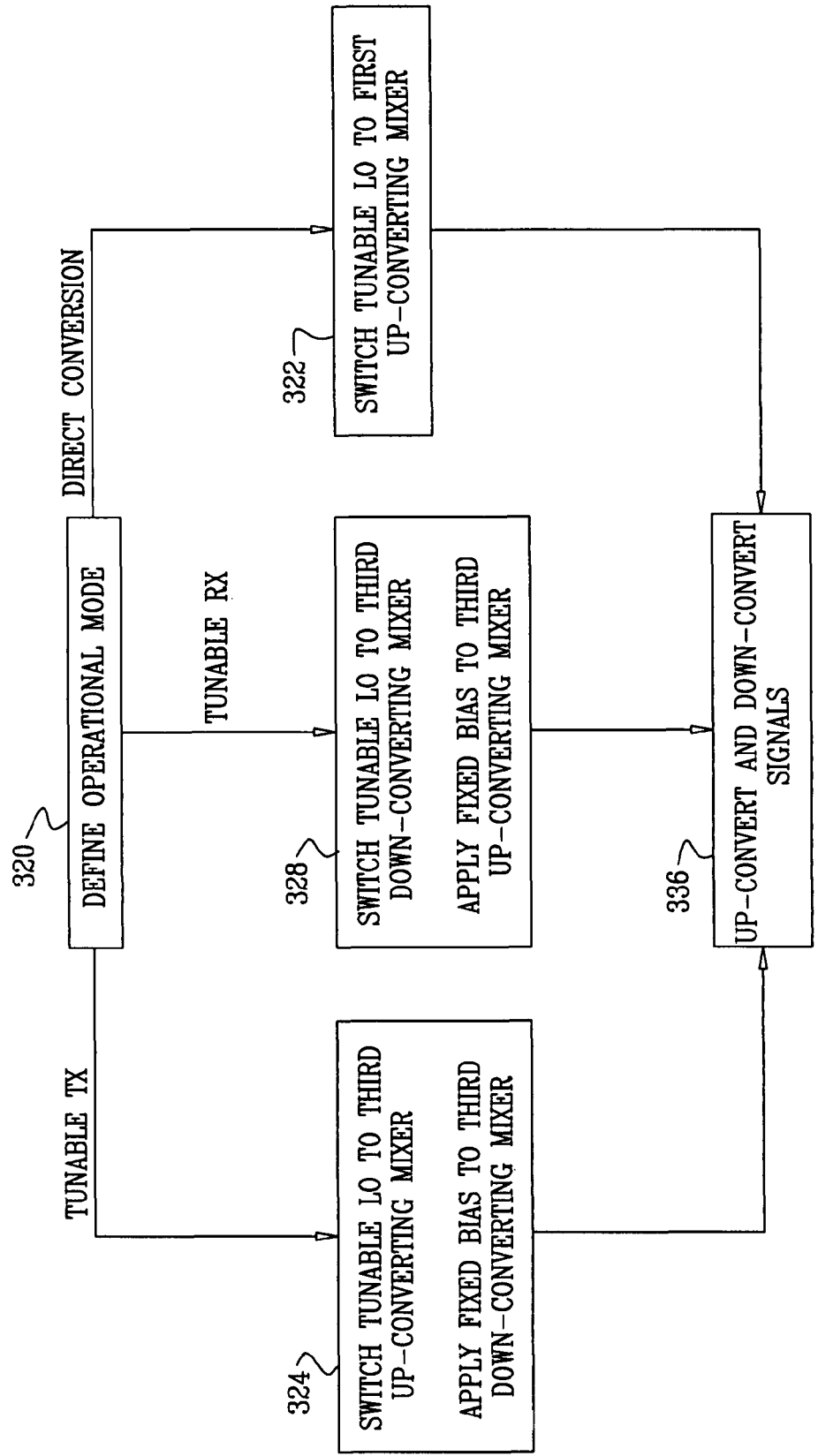
FIG. 5 is a flow chart that schematically illustrates a method for operating a multi-mode baseband-IF converter, in accordance with an embodiment of the present invention.

FIG. 5 is a flow chart that schematically illustrates a method for operating multi-mode baseband-IF converter 110, in accordance with an embodiment of the present invention. The method begins with controller 60 determining the desired operational mode of converter 110, at a mode setting step 320. If the BB-IF converter is to operate in the tunable-TX mode, controller 60 configures converter 110 accordingly, at a tunable-TX setting step 324. Controller 60 sets switch 166 to connect tunable oscillator 162 to mixer 130. Mixer 134 is bypassed. Controller 60 also programs oscillators 146, 150, 154 and 158 to their appropriate frequencies, as described above.

If the BB-IF converter is to operate in the tunable-RX mode, controller 60 configures converter 110 accordingly, at a tunable-RX setting step 328. Controller 60 sets switch 166 to connect tunable oscillator 162 to mixer 134. Mixer 130 is bypassed. Controller 60 also programs oscillators 146, 150, 154 and 158 to their appropriate frequencies.

If, on the other hand, converter 110 is to operate in the direct up-conversion mode, controller 60 configures the BB-IF converter accordingly, at a direct up-conversion setting step 332. Controller 60 deactivates oscillators 146 and 150, and sets switches 166 and 174 to connect tunable oscillator 162 to mixer 122. Controller 60 also programs oscillators 154 and 158 to their appropriate frequencies, as in the tunable TX mode.

BB-IF converter 110 then performs up-conversion and down-conversion in the selected operational mode, at an operation step 336.

Alternative BB-IF Converter Configuration

FIG. 6 is a block diagram that schematically illustrates a multi-mode baseband-IF converter 350, in accordance with an alternative embodiment of the present invention. In some embodiments, converter 350 is implemented in a single RFIC device. Similarly to converter 110 of FIG. 4 above, BB-IF converter 350 can be used to implement converter 24 in the configuration of FIG. 1 above and/or to implement converter 104 in the configuration of FIG. 3 above. Two converters 350, one located in the IDU and one in the ODU, can be used to implement converters 84 and 88 in the configuration of FIG. 2 above. Converter 350 may be configured and operated in accordance with the method of FIG. 5 above.

Converter 350 supports multiple operational modes, which are set via an external interface, such as by controller 60. The device supports programmable TX/RX separation, and can be set to operate over a wide frequency bandwidth. Different operational modes enable tunable-TX, tunable-RX and direct up-conversion/down-conversion operation in the same device. Although the description that follows addresses specific frequency values, frequency ranges and bandwidths, the principles of the present invention can be used to implement BB-IF converters that use any other suitable set of RF values, IF values and/or bandwidths.

The description that follows initially describes the operation of converter 350 when performing up-conversion and down-conversion between a baseband signal and a high-IF signal in a single device. Other operational modes will be described further below.

Converter 350 comprises an up-converter, which comprises a first up-conversion module 354 and a second up-conversion module 358. Each of the two modules performs one up-conversion operation, jointly up-converting a baseband signal to high IF using two conversion operations. Converter 350 comprises a down-converter, which comprises a first down-conversion module 362 and a second down-conversion module 366. Each of the two modules performs one down-conversion operation, jointly down-converting a high IF signal to baseband using two conversion operations.

In some embodiments, the input baseband signal entering the up-converter is filtered by a pair of low-pass filters 370, which may have cutoff frequencies of approximately 21, 42 or 84 MHz, depending on the desired channel/signal bandwidth. (In alternative embodiments, e.g., when the up-converter accepts an interim IF signal produced by another BB-IF converter, filters 370 are not used and the input signal is amplified by a variable-gain amplifier 382.) The filtered signal is up-converted by a Quadrature up-converter (up-converting mixer) 374 to produce an interim IF signal. In the present example, the interim IF signal has a center frequency of 4700 MHz. Typically, mixer 374 is broadband and is able to produce IF signals having frequencies of several hundred to several thousand MHz, as will be shown below.

Quadrature mixer 374 uses an LO signal produced by an oscillator 378, which in the present example is tunable over the range 4700-5055 MHz. (In configurations in which module 354 produces an interim IF signal that is provided to another BB-IF converter, the LO that feeds mixer 374 is received from the other BB-IF converter and is divided by a 1:16 frequency divider 386. A switch 390, typically controlled by controller 60, selects between the two alternative LO sources.)

The output of module 354 (the interim IF signal) is filtered by a band-pass filter 394, which in the present example has a center frequency of 4700 MHz and a bandwidth of 168 MHz. Typically, filter 394 is external to converter 350. The output of filter 394 is fed back into converter 350, to the input of module 358.

Module 358 comprises a mixer 398, which up-converts the signal to high IF. An oscillator 402 provides the LO signal that drives mixer 398. In the present example, the frequency of oscillator 402 is tunable over the range of 6000-8790 MHz. Note that in the present example the frequency of oscillator 402 is higher than the frequency of the interim IF signal, and the frequency of the interim IF signal is higher than the frequency of the high IF signal. The output of mixer 398 is amplified by an amplifier 406, whose gain may be controlled by controller 60. The amplifier output is filtered by a low-pass filter 410 and provided as output.

A high IF signal to be down-converted is filtered by a low-pass filter 414 and provided as input to module 362. Filter 414 may have a cutoff frequency of approximately 1.6, 2.6 or 3.5 GHz, depending on the configuration used. In module 362, the input signal is amplified by an amplifier 418, whose gain can be controlled by controller 60. The signal is then down-converted by a mixer 422, which is driven by an LO signal produced by an oscillator 426. Oscillator 422 may be tunable over the range 5000-7500 MHz or over the range 2060-3575 MHz, depending on the configuration used.

The output of mixer 422 is filtered by a filter 430, which is typically external to converter 350. Filter 430 has a bandwidth of 60 MHz, and may have a center frequency of either 1960 or 4000 MHz, depending on the configuration used. The output of filter 430 is fed back into converter 350, to the input of module 366.

In module 366, the signal is amplified by an amplifier 434, whose gain can be controlled by controller 60. The amplified signal is down-converted by a Quadrature down-converter (down-converting mixer) 438, to produce a Quadrature baseband signal. An oscillator 442, which is the present example may have a frequency of 4000 or 1960 MHz, provides the LO signal that drives mixer 438. When the IF signal is provided to module 366 from another converter 350, mixer 438 is driven by an external LO signal, which is provided by the other BB-IF converter and is divided by a 1:48 frequency divider 446. In the present example, the external LO signal is tunable in the range 6000-6960 MHz. A switch 450, which is controlled by controller 60, selects between the two possible LO sources.

The Quadrature baseband signal produced by mixer 438 is filtered by a pair of low-pass filters 454, amplified by a pair of amplifiers 458, and provided as output. The signal at the input of mixer 438 may also be amplified by an amplifier 460 and provided as output.

Oscillators 378, 402, 426 and 442, switches 390 and 450 and frequency dividers 386 and 446 can be viewed collectively as a LO generation circuit, which produces the appropriate LO signals for driving the different mixers of BB-IF converter 350. The LO generation circuit applies the appropriate LO switching, depending on the operational mode used by the device, so as to drive each mixer with the appropriate LO signal.

Similarly to the configuration of FIG. 4 above, the different oscillators in converter 350 are locked to a common reference signal, which is supplied by a frequency source external to the IF-BB converter. Converter 350 comprises a reference distribution unit 462, which accepts the external reference signal and distributes it to the different oscillators. Converter 350 may be connected to controller 60 using any suitable interface, such as an SPI 242. Converter 350 comprises several detectors 470 for sensing the power levels at various points in the up-converter and down-converter chains.

BB-IF converter 350 can be used in any of the system configurations of FIGS. 1-3 above. The description of FIG. 6 above referred to dual-conversion operation of a single converter 350, such as when implementing BB-IF converter 36 of FIG. 1 above. Alternatively, the up-conversion and down-conversion operations can be split between an IDU and an ODU, such as in the configuration of FIG. 2 above. In this configuration, two converters 350 can be deployed as converters 84 and 88 in the IDU and ODU, respectively.

Converter 350 in the IDU up-converts the input baseband signal to an interim IF signal using module 354. Oscillator 402 in module 358 produces the LO signal driving mixer 374. In this configuration, oscillator 402 produces an LO signal that is tunable in the range 6000-8790 MHz. Divider 386 divides the LO signal frequency by 16. The divided LO signal is provided to mixer 374 via switch 390, which is set by controller 60 accordingly. Mixer 374 in this configuration produces a 350 MHz interim IF signal. The signal is filtered by a suitable band-pass filter and fed to cable 80, feeding the ODU.

In converter 350 of the ODU, the 350 MHz signal sent from the IDU enters amplifier 382 in module 354. Oscillator 378 of this converter drives mixer 374 of this converter with a 5050 MHz LO signal, thus mixer 374 produces a 4700 MHz IF signal. This signal is filtered by a suitable external band-pass filter and is fed into module 358 of this converter. Module 354 performs an additional conversion using mixer 398, to produce a 2, 3 or 4.1 GHz high IF signal. Thus, up-conversion is carried out in a total of three conversions, two of which are performed in the ODU.

In the opposite direction, module 362 of converter 350 in the ODU accepts a 1.6, 2.6 or 3.5 GHz high IF signal to be down-converted. Module 362 converts the signal using mixer 422 to produce a 4000 MHz signal. The signal is filtered using a suitable band-pass filter and provided to module 366 of this converter. Oscillator 442 provides a suitable LO signal via switch 450, so that mixer 438 produces an IF signal at 140 MHz. The 140 MHz signal is driven down cable 80 to the IDU.

At the IDU, the 140 MHz IF signal is filtered by a suitable band-pass filter and provided to module 366 of converter 350 in the IDU. The LO signal used by mixer 438 is provided by oscillator 426 in module 362, which is tuned in the range 5000-7500 MHz. The LO frequency is divided by 48 by divider 446 and fed via switch 450 to mixer 438. Mixer 438 converts the IF signal to baseband, and the baseband signal is provided as output via filters 458. Note that mixer 438 is broadband, operating at several GHz in some configurations and around 100 MHz in others.

Further alternatively, a single converter 350 can be used to perform direct up-conversion from baseband to high IF using module 354, and/or direct down-conversion from high IF to baseband using module 366. Since oscillators 374, 402, 426 and 442 are independently tunable over wide frequency ranges, the configurations described above can support flexible TX/RX separation, TX frequencies that are higher or lower than the RX frequencies, as well as tunable-TX and tunable RX configurations.

Although the embodiments described herein mainly address down-conversion and up-conversion to and from baseband, the principles of the present invention can also be used for performing down-conversion and up-conversion to and from a low intermediate frequency. Thus, the term "baseband signal" is used herein to describe any digitally-represented signal that is produced or processed by a modem, as well as any analog signal that is produced by a DAC or sampled by an ADC. The frequencies of such baseband signals are typically up to several tens of MHz depending on modulation BW (baud rate).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A configurable frequency conversion device, comprising:
    an up-converter, which comprises up-converter mixers and is arranged to convert an input transmit signal to an interim transmit signal at an intermediate transmit frequency and to convert the interim transmit signal to an output transmit signal at an output frequency by mixing the input transmit signal using the up-converter mixers;
    a down-converter, which comprises down-converter mixers and is arranged to convert an input receive signal at an input frequency to an interim receive signal at an intermediate receive frequency and to convert the interim receive signal to an output receive signal by mixing the input receive signal using the down-converter mixers; and
    Local Oscillator (LO) generation circuitry, which is arranged to generate multiple LO signals having respective LO frequencies and is coupled to drive the up-converter and down-converter mixers with the LO signals, and which is externally configurable to modify one or more of the LO frequencies so as to modify any of the output frequency, the input frequency, and a separation between the output frequency and the input frequency without changing the intermediate receive and transmit frequencies.

2. The device according to claim 1, wherein the LO generation circuitry is externally configurable to operate in multiple operational modes, which comprise at least:
    a first operational mode, in which the input transmit signal and the output receive signal comprise baseband signals, and the output transmit signal and the input receive signal comprise first Intermediate Frequency (IF) signals in a first frequency range;
    a second operational mode, in which the input transmit signal and the output receive signal comprise the baseband signals, and the output transmit signal and the input receive signal comprise second IF signals in a second frequency range that is different from the first frequency range; and
    a third operational mode, in which the input transmit signal and the output receive signal comprise the second IF signals, and the output transmit signal and the input receive signal comprise third IF signals in the first frequency range.

3. The device according to claim 2, and comprising:
    a low-frequency interface coupled to input the input transmit signal and output the output receive signal; and
    a high-frequency interface, coupled to output the output transmit signal and input the input receive signal, and configured, when the LO generation circuitry is operating in the second operational mode, to be coupled to the low-frequency interface of another configurable frequency conversion device, whose LO generation circuitry is operating in the third operational mode.

4. The device according to claim 3, wherein the high frequency interface is configured to be connected to the low-frequency interface of the other configurable frequency conversion device via a transmission line.

5. The device according to claim 2, wherein the first operational mode comprises first and second sub-modes, wherein the up-converter and the down-converter are each configured to perform a single frequency conversion operation when the LO generation circuitry is operating in the first sub-mode, and two or more frequency conversion operations when the LO generation circuitry is operating in the second sub-mode.

6. The device according to claim 1, wherein only one of the LO signals generated by the LO generation circuitry is tunable, and wherein the LO generation circuitry can be programmed to modify a frequency of the tunable LO signal.

7. The device according to claim 1, wherein the LO generation circuitry can be programmed to tune one of the input frequency and the output frequency, while keeping the other of the input frequency and the output frequency fixed.

8. The device according to claim 1, wherein the LO generation circuitry can be programmed to set the output frequency both to values that are higher than the input frequency and to values that are lower than the input frequency.

9. The device according to claim 1, wherein the up-converter and the down-converter operate concurrently with one another in full-duplex.

10. The device according to claim 1, wherein one or more of the up-converter and down-converter mixers comprises a Gilbert cell mixer, and wherein the LO generation circuitry can be configured to bypass the Gilbert cell mixer by applying a fixed bias voltage to the Gilbert cell mixer.

11. The device according to claim 1, and comprising a high-frequency interface, which is coupled to output the output transmit signal and input the input receive signal, and is configured to be coupled to a Radio Frequency (RF) conversion unit for up-converting the output transmit signal to a transmit RF signal and for down-converting a receive RF signal to produce the input receive signal.

12. The device according to claim 1, and comprising a controller, which is arranged to externally configure the LO generation circuitry.

13. A frequency conversion apparatus, comprising:
    an Intermediate Frequency (IF) conversion unit, comprising:
        an up-converter, which comprises up-converter mixers and is arranged to convert an input transmit signal to an interim transmit signal at an intermediate transmit frequency and to convert the interim transmit signal to a transmit IF signal at an output frequency by mixing the input transmit signal using the up-converter mixers;
a down-converter, which comprises down-converter mixers and is arranged to convert a receive IF signal at an input frequency to an interim receive signal at an intermediate receive frequency and to convert the interim receive signal to an output receive signal by mixing the input receive signal using the down-converter mixers; and
Local Oscillator (LO) generation circuitry, which is arranged to generate multiple LO signals having respective LO frequencies and is coupled to drive the up-converter and down-converter mixers with the LO signals, and which is externally configurable to modify one or more of the LO frequencies so as to modify any of the output frequency, the input frequency, and a separation between the output frequency and the input frequency without changing the intermediate receive and transmit frequencies; and
a Radio Frequency (RF) conversion unit, which is arranged to up-convert the transmit IF signal to produce a transmit RF signal and to down-convert a receive RF signal to produce the receive IF signal.

14. A frequency conversion apparatus for converting between baseband signals and Intermediate Frequency (IF) signals, comprising:
a first subsystem, which comprises a first frequency conversion device comprising first and second cascaded conversion stages; and
a second subsystem, which is connected to the first subsystem by a transmission line and comprises a second frequency conversion device identical to the first frequency conversion device,
wherein the second conversion stage of the first frequency conversion device is bypassed so that the first subsystem is configured to convert between the baseband signals and interim IF signals, and wherein the first conversion stage of the second frequency conversion device is bypassed so that the second subsystem is configured to convert between the interim IF signals exchanged with the first subsystem and the IF signals.

15. A method for frequency conversion in a configurable frequency conversion device, the method comprising:
up-converting an input transmit signal to an interim transmit signal at an intermediate transmit frequency and converting the interim transmit signal to an output transmit signal at an output frequency using up-converter mixers;
down-converting an input receive signal at an input frequency to an interim receive signal at an intermediate receive frequency and converting the interim receive signal to an output receive signal using down-converter mixers; and
generating multiple Local Oscillator (LO) signals having respective LO frequencies, driving the up-converter and down-converter mixers with the LO signals, and, in response to external configuration, modifying one or more of the LO frequencies so as to modify any of the output frequency, the input frequency, and a separation between the output frequency and the input frequency without changing the intermediate receive and transmit frequencies.

16. The method according to claim 15, wherein the external configuration defines operational modes, which comprise at least:
a first operational mode, in which the input transmit signal and the output receive signal comprise baseband signals, and the output transmit signal and the input receive signal comprise first Intermediate Frequency (IF) signals in a first frequency range;
a second operational mode, in which the input transmit signal and the output receive signal comprise the baseband signals, and the output transmit signal and the input receive signal comprise second IF signals in a second frequency range that is different from the first frequency range; and
a third operational mode, in which the input transmit signal and the output receive signal comprise the second IF signals, and the output transmit signal and the input receive signal comprise third IF signals in the first frequency range.

17. The method according to claim 16, wherein up-converting the input transmit signal and down-converting the input receive signal comprise, when operating in the second operational mode, outputting the output transmit signal to, and inputting the input receive signal from, another configurable frequency conversion device that operates in the third operational mode.

18. The method according to claim 17, wherein outputting the output transmit signal and inputting the input receive signal comprise connecting to the other configurable frequency conversion device via a transmission line.

19. The method according to claim 16, wherein the first operational mode comprises first and second sub-modes, wherein up-converting the input transmit signal and down-converting the input receive signal each comprise performing a single frequency conversion operation when operating in the first sub-mode, and performing two or more frequency conversion operations when operating in the second sub-mode.

20. The method according to claim 15, wherein modifying the one or more of the LO frequencies comprises tuning only one of the LO frequencies.

21. The method according to claim 15, wherein modifying the one or more of the LO frequencies comprises tuning one of the input frequency and the output frequency, while keeping the other of the input frequency and the output frequency fixed.

22. The method according to claim 15, wherein modifying the one or more of the LO frequencies comprises programming the LO frequencies so as to set the output frequency both to values that are higher than the input frequency and to values that are lower than the input frequency.

23. The method according to claim 15, wherein up-converting the input transmit signal and down-converting the input receive signal are performed concurrently in full-duplex.

24. The method according to claim 15, and comprising up-converting the output transmit signal to produce a transmit RF signal and down-converting a receive RF signal to produce the input receive signal.

25. A method for frequency conversion between baseband signals and Intermediate Frequency (IF) signals, comprising:
connecting a first subsystem, which includes a first frequency conversion device that includes first and second cascaded conversion stages via a transmission line to a second subsystem, which includes a second frequency conversion device identical to the first frequency conversion device;

configuring the first subsystem to convert between the baseband signals and interim IF signals by bypassing the second conversion stage of the first frequency conversion device;

configuring the second subsystem to convert between the interim IF signals exchanged with the first subsystem and the IF signals by bypassing the first conversion stage of the second frequency conversion device; and converting between the baseband signals and the IF signals using the connected first and second subsystems.

* * * * *